3,040,053
2-HYDROXYCYCLOHEXYLTHIOTHIAZOLES
John J. d'Amico, Charleston, W. Va., assignor to Monsanto Chemical Company, St. Louis, Mo., a corporation of Delaware
No Drawing. Filed Oct. 19, 1960, Ser. No. 63,481
5 Claims. (Cl. 260—302)

The present invention relates to new and useful compositions of matter. More particularly it relates to 2-hydroxycyclohexylthiothiazoles.

The new class of compounds may be represented by the formula

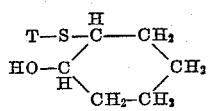

where T represents a thiazolyl radical. Typical examples of T are 4-ethylthiazolyl, 4-methylthiazolyl, 4,5-dimethylthiazolyl, 4,5-diethylthiazolyl, 4-methyl-5-carbomethoxythiazolyl, 4-methyl-5-carboethoxythiazolyl, 4-carboethoxythiazolyl, 4-methyl-5-carbamylthiazolyl, 4-methyl-5-phenylcarbamylthiazolyl, benzothiazolyl, 4-ethylbenzothiazolyl, 7-methylbenzothiazolyl, 4-methylbenzothiazolyl, 5-methylbenzothiazolyl, 6-methylbenzothiazolyl, 4-chlorobenzothiazolyl, 4-methyl-6-chlorobenzothiazolyl, 6-chlorobenzothiazolyl, 6-phenylbenzothiazolyl, 4-phenylbenzothiazolyl, 4,5-dimethylbenzothiazolyl, 4,6-dimethylbenzothiazolyl, 4-methoxybenzothiazolyl, 5-methoxybenzothiazolyl, 6-methoxybenzothiazolyl, 4-methoxy-6-chlorobenzothiazolyl, 4-ethoxybenzothiazolyl, 5-ethoxybenzothiazolyl, 4,6-dimethyl-7-chlorobenzothiazolyl and 4,6-dimethyl-5,7-dichlorobenzothiazolyl.

Due to the tendency of ortho-halogenated cyclohexanol to split out hydrogen halide the compounds are not readily obtainable by direct condensation of the mercaptothiazoles and ortho-halogenated cyclohexanol. However, they are easily formed by reduction of the corresponding thiazolylthiocyclohexanones. Prepartion of the latter is described in co-pending application Serial No. 63,254, filed October 18, 1960.

The following examples illustrate the preparation of the new compounds but are are not to be taken as limitative.

EXAMPLE 1

To a stirred solution of 10 grams (0.038 mole) of 2-(2-benzothiazolylthio)cyclohexanone in 100 ml. of ethyl alcohol was added dropwise at 65–70° C., 1.45 grams (0.038 mole) of sodium boronhydride dissolved in 100 ml. of ethyl alcohol. After the addition, which required 15 minutes, the mixture was held at a temperature of 70–78° C. for 1 hour. After cooling to 25° C., the mixture was added to 500 grams of ice-water and stirred at 0–10° C. for 2 hours. The precipitate was collected by filtration, washed with water until neutral to litmus and air-dried at 25–30° C. The 2-(2-hydroxycyclohexylthio)benzothiazole was obtained as a white solid. After successive recrystallization from ethyl alcohol and heptane it melted at 88–90° C. Analysis gave 5.3% nitrogen and 24.2% sulfur, the calculated values for $C_{13}H_{15}NOS_2$. The identity of the product was further confirmed by infrared.

A slurry of 26.5 grams (0.1 mole) of 2-(2-hydroxycyclohexylthio)benzothiazole in 300 ml. of heptane was prepared. The slurry was stirred while adding to it 14.9 grams (0.1 mole) of p-methoxyphenyl isocyanate in one portion. The resulting mixture was then heated at 80–90° C. for 6 hours. After cooling to 5° C. the heptane was decanted and the semi-solid residue removed from the flask and air-dried on a porous plate. The product, 2-(benzothiazol-2-yl-thio)cyclohexyl p-methoxycarbanilate, was obtained in 67.5% yield. After recrystallization from a mixture of acetone and ethyl alcohol it melted at 141–143° C. Analysis gave 6.5% nitrogen and 15.5% sulfur compared to 6.8% nitrogen and 14.5% sulfur calculated for $C_{21}H_{22}N_2O_3S_2$.

EXAMPLE 2

To a stirred solution of 89.4 grams (0.3 mole) of 2-(5-chloro-2-benzothiazolylthio)cyclohexanone in 300 ml. of ethyl alcohol was added dropwise at 65–70° C. over a 30 minute period, 11.4 grams (0.3 mole) of sodium boronhydride dissolved in 600 ml. of ethyl alcohol. Stirring was continued while the solution was heated at 75–80° C. for one hour. After cooling to 25° C. the reaction mixture was poured into 1500 grams of ice-water and stirred at 0–10° C. for two hours. The precipitate was collected by filtration, washed with water until the washings were neutral to litmus and air-dried at 25–30° C. The product, 2-(2-hydroxycyclohexylthio)-5-chlorobenzothiazole was obtained in 78.2% yield. After recrystallizing from heptane it melted at 90–91° C. Analysis gave 4.7% nitrogen, 21.3% sulfur and 12.2% chlorine compared to 4.7% nitrogen, 21.4% sulfur and 11.8% chlorine calculated for $C_{13}H_{14}ClNOS_2$. The mixed melting point with 2-(5-chloro-2-benzothiazolylthio)cyclohexanone, M.P. 92–93° C., was depressed.

EXAMPLE 3

To a stirred solution of 34.7 grams (0.1 mole) of 2-(4-methyl-5-phenylcarbamylthiazolylthio)cyclohexanone and 200 ml. of ethyl alcohol was added dropwise at 65–70° C. in 30 minutes 3.8 grams (0.1 mole) of sodium boronhydride dissolved in 200 ml. of ethyl alcohol and the reaction mixture heated for one hour at 75–80° C. After cooling to 25° C. the reaction mixture was added to 1000 grams of ice-water, the solution stirred at 0–10° C. for one hour and isolated as above. 2-(2-hydroxycyclohexylthio)-4-methyl-5-phenylcarbamylthiazole was obtained in 57.5% yield as a cream solid. After recrystallization from alcohol it melted at 131–132° C. Analysis gave 8.4% nitrogen as compared to 8.0% calculated for $C_{17}H_{20}N_2O_2S_2$.

The new compounds are valuable intermediates for the preparation of complex esters and carbamates. The stearates, adipates, butyrates and even the acetates are plasticizers of low volatility. The alcohols per se accelerate the vulcanization of rubber.

As illustrative of accelerating properties, compositions were compounded comprising

| Stock | A | B |
|---|---|---|
| | Parts by weight | |
| Smoked sheets rubber | 100 | 100 |
| Carbon black | 50 | 50 |
| Zinc oxide | 5 | 5 |
| Stearic acid | 3 | 3 |
| Saturated hydrocarbon softener | 3 | 3 |
| Antioxidant | 1.5 | 1 |
| Sulfur | 2.5 | 2.5 |
| 2-(2-Hydroxycyclohexylthio) benzothiazole | 0.5 | |
| 2 - (2 - Hydroxycyclohexylthio) - 4 - methyl-5-phenylcarbamylthiazole | | 0.5 |

The compositions were cured by heating in a press for different periods of time at 144° C. The physical properties exhibited by the optimum or 60 minute cures were as follows:

Table I

| Stock | Modulus of Elasticity in lbs./in.² at Elongation of 500% | Tensile at Break in, lbs./in.² | Ultimate Elongation, Percent |
| --- | --- | --- | --- |
| A | 1,670 | 1,780 | 520 |
| B | 1,200 | 1,350 | 540 |

Although the invention has been illustrated by various specific embodiments, it is not limited thereto. For example, the 2-hydroxycyclohexylthiothiazoles may be used for the acceleration of other types of sulfur-vulcanizable rubbers. These rubbers comprise natural rubber in its various forms, as for example latex, crepe, smoked sheets, gutta-percha, balata and cyclo rubbers. They are applicable generally for acceleration of natural and synthetic elastomers, as for example polybutadiene, polyisoprene and polyisobutylene polymerized with a small proportion of a diolefin.

It is intended to cover all changes and modifications of the examples of the invention herein chosen for purposes of disclosure which do not constitute departures from the spirit and scope of the invention.

What is claimed is:
1. A 2-(2-hydroxyclclohexylthio)thiazole of the formula

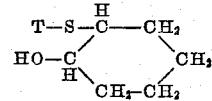

where T is a member of the group consisting of 4-(lower alkyl)-2-thiazolyl, 4-(lower alkyl)-5-(lower carboalkoxy)-2-thiazolyl, 4,5-di-(lower alkyl)-2-thiazolyl, 4-(lower carboalkoxy)-2-thiazolyl, 4-(lower alkyl)-5-carbamyl-2-thiazolyl, 4-(lower alkyl)-5-(N-phenylcarbamyl)-2-thiazolyl, 2-benzothiazolyl, monochloro-2-benzothiazolyl mono- and di-(lower alkyl)-2-benzothiazolyl, mono-(lower alkyl)monochloro-2-benzothiazolyl, mono-(lower alkoxy)-2-benzothiazolyl, mono-(lower alkoxy)-monochloro-2-benzothiazolyl, phenyl-2-benzothiazolyl), di-lower alkyl)-monochlorobenzothiazolyl and di-(lower alkyl)dichloro-2-benzothiazolyl.

2. 2-(2-hydroxycyclohexylthio)benzothiazole.
3. 2 - (2 - hydroxycyclohexylthio) - 4 - methyl - 5 - N-phenylcarbamylthiazole.
4. 2-(2-hydroxycyclohexylthio)-5-chlorobenzothiazole.
5. 2 - (benzothiazol - 2 - yl - thio)cyclohexyl p - methoxy-carbanilate.

References Cited in the file of this patent
UNITED STATES PATENTS

| 2,400,469 | Scott | May 14, 1946 |
| 2,746,970 | D'Amico | May 22, 1956 |